Nov. 26, 1968    R. C. ROBERTS    3,413,087
METHOD FOR EXTRACTING ALUMINA FROM ITS ORES
Filed March 13, 1964    2 Sheets-Sheet 2

INVENTOR.
RICHARD C. ROBERTS
BY
Glenn, Palmer & Matthews
ATTORNEYS

United States Patent Office 3,413,087
Patented Nov. 26, 1968

3,413,087
METHOD FOR EXTRACTING ALUMINA
FROM ITS ORES
Richard C. Roberts, Chesterfield County, Va., assignor to Reynolds Metals Company, Richmond, Va., a corporation of Delaware
Continuation-in-part of application Ser. No. 302,535, Aug. 16, 1963. This application Mar. 13, 1964, Ser. No. 351,866
16 Claims. (Cl. 23—143)

ABSTRACT OF THE DISCLOSURE

A method of extracting alumina from bauxite by digestion with caustic alkali solution, in which the silica content of the ore is insolubilized and the heat recoverable from the digestion process is utilized and scale formation is reduced. The bauxite is digested at elevated temperature and pressure followed by cooling of the resulting digestion liquor with recovery of steam generated thereby, alumina being separated from the digestion liquor and spent liquor recycled for treatment of fresh ore. A thick slurry of fresh comminuted ore and caustic alkali solution is prepared, the amount of the solution being insufficient to dissolve all the soluble alumina but sufficient to dissolve substantially all the silica in the ore, and the slurry is treated to precipitate substantially all the silica present. Then the ore slurry is heated by indirect heat exchange with recovered steam, and the heated slurry is passed to the digestion stage, while the resulting spent liquor containing residual silica is partly recycled to the initial ore preparation stage.

---

Figure 1:
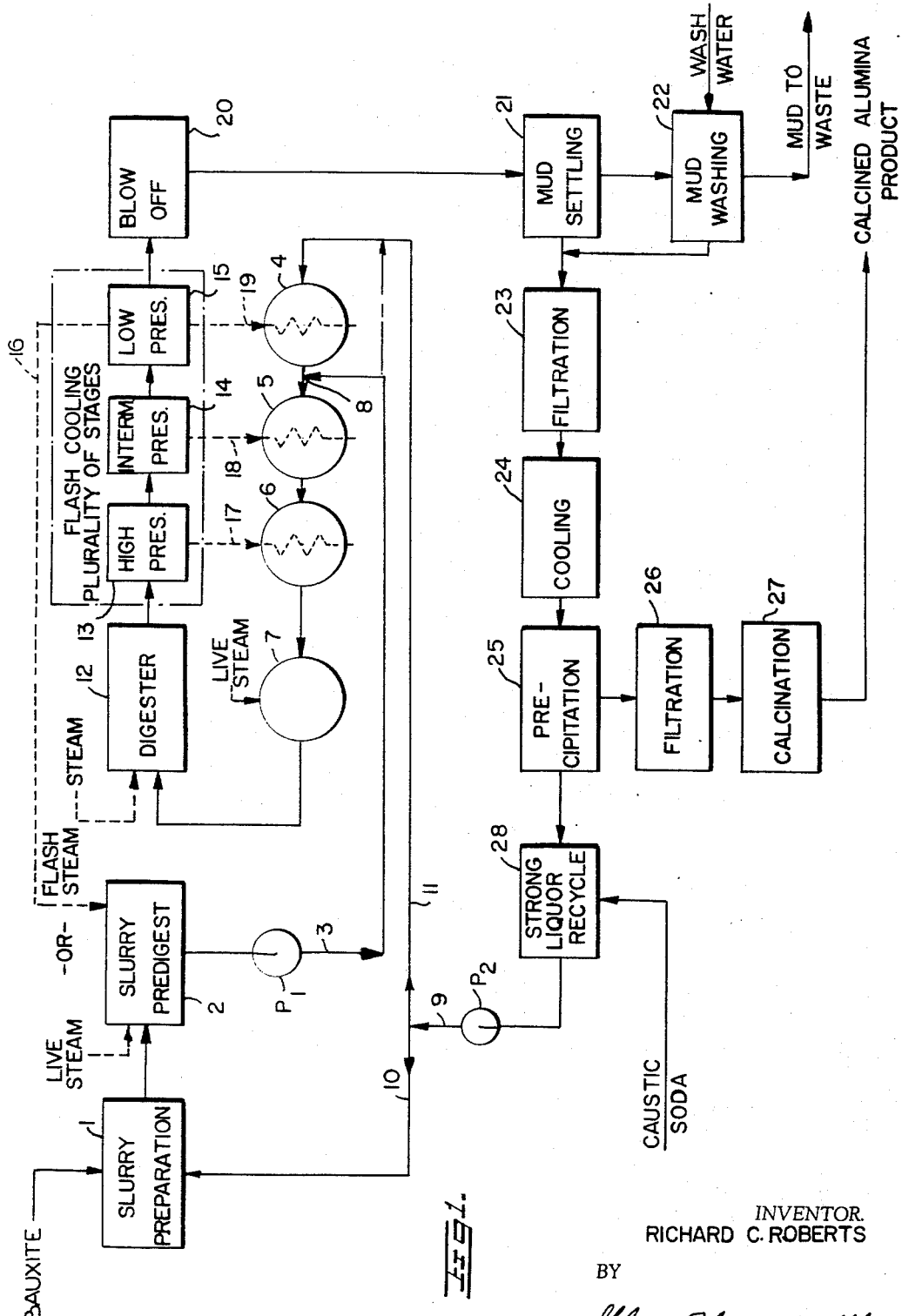

This application is a continuation-in-part of application Ser. No. 302,535, filed Aug. 16, 1963, now abandoned.

This invention relates to an improved method for the extraction of alumina values from aluminous ores by digestion with caustic alkali solutions. More particularly, the invention concerns a method for utilizing the heat recoverable from the digestion process and the insolubilization of the silica content of the ore by means of a novel predigestion treatment.

The novel method of the invention is adapted to the processing of aluminous ores generally, and particularly ores of the bauxite type. The term bauxite is generally used to designate a natural aggregate of aluminum-bearing minerals, more or less impure, in which the aluminum occurs largely as hydrated oxides.

The most commonly used method for extracting alumina from bauxite is the Bayer process. In accordance with the Bayer process, the ground bauxite is digested with an aqueous solution of an alkali, such as, for example, caustic soda, or a mixture of caustic soda and sodium carbonate. There is obtained a slurry which comprises a suspension of the constituents of the bauxite other than alumina and which are insoluble in the alkali liquor. The liquor contains the alumina dissolved in the form of a supersaturated sodium aluminate solution. The constituents of the bauxite which remained unattacked during the alkali digestion form an insoluble residue, known as red mud. For recovery of the alumina, the sodium aluminate solution or liquor is separated from the red mud by filtration or sedimentation or a combination of both. The clarified liquor comprises an unstable solution of alumina from which most of the dissolved alumina is percipitated by seeding with alumina hydrate. The precipitated alumina hydrate is then separated from the liquor by sedimentation and filtration, washed, and calcined at high temeprature to form alumina.

In conventional Bayer process operation, following digestion of the ground bauxite with caustic liquor, and after precipitation of approximately one-half of the caustic soluble alumina therefrom as alumina hydrate, there is obtained a half-saturated liquor known as spent liquor. The spent liquor is customarily partially concentrated by evaporation to remove water equivalent to that introduced into the system with the ore and the water used for washing the red mud and the hydrated alumina. Make-up caustic soda is added to replace process caustic losses, and the spent liquor is recycled to the bauxite pretreatment and main digestion stages.

Customarily the recycle spent liquor is divided into a major portion and a minor portion, typically 80% and 20% by volume. The major portion is reheated to as near the digestion temperature as possible through successive stages by steam generated in a series of flash cooling stages subsequent to the digestion vessels in which the main digestion of the bauxite takes place. This heating is usually carried out in shell and tube type indirect heat exchangers, and this is followed by direct steam injection in the digester vessel to brings about a final elevation of the major portion of the recycle liquor to digestion temperature.

The minor portion of the spent recycle liquor is customarily employed as a vehicle for establishing a slurry of fresh bauxite to be fed to the main digestion sequence. Typically, a small amount of the cool recycle caustic liquor is added to the bauxite, the mixture is fed to a grinder, and then there is added to the ground mixture the major portion of the recycle liquor previously described, additional steam being introduced to raise the temperature of the mixture to the digestion temperature, for example, about 290° F. to 480° F.

The combined mixture is then digested in a digester whereby the sodium hydroxide in the liquor reacts with the alumina in the bauxite to form sodium aluminate, and the hot digester product passes from the digester to a series of flash cooling tanks. The heat from these flash cooling tanks is transferred to the aforesaid major portion of recycle spent liquor returning through adjacent indirect heat exchangers. The steam generated in the flash cooling of the digester discharge liquor represents "recovered" steam, and reduces the total heat demand of the process.

In the Bayer operations of the prior art, the minor portion of the recycle liquor has customarily been heated to some temperature less than the boiling point of the liquor. This was done by partially heating the liquor to about 180° F. prior to slurry formation. This had the disadvantage of unfavorably affecting the heat balance of the system by requiring additional heat from an outside source.

In accordance with the present invention, it has been found that recovered or flash steam may be successfully employed for heating the mixture of the minor portion of the spent recycle liquor and the aluminous ores that are suspended as a slurry in the liquor stream. It is a further feature of the invention that the use of such recovered steam generated in the flash cooling of the digester discharge liquor serves to reduce the overall heat demand of the process.

In accordance with another aspect of the invention, there is provided a novel method whereby a slurry of the aluminous ore in a minor portion of the spent recycle liquor can be successfully subjected to heat exchange in indirect heat exchangers with substantial avoidance of the rapid scaling and deterioration of the heat transfer surfaces. In this way, recovered steam from flash cooling of the digester discharge liquor can be more fully employed, with additional heat economy.

This is accomplished by predigesting all the bauxite in a caustic alkali solution (for example, in a small portion of the spent recycle liquor, or in strong liquor containing make-up caustic alkali), the quantity of caustic alkali present being insufficient to dissolve all the soluble alumina in the bauxite but sufficient to dissolve substantially all the silica in the bauxite, at an elevated temperature and for a time sufficient to permit desilication of the liquor by precipitation of the silica in the form of insoluble complex sodium aluminum silicate.

By maintaining the slurry in the predigestion stage at a temperature from about 150° F. to the temperature used for the main digestion step (ordinarily in the range 290–490° F.), for a sufficient length of time (½ to 12 hours), crystallization and precipitation of the silica takes place in the form of a complex sodium aluminum silicate, known as "desilication product." The crystals of desilication product act as a seed, promoting nucleation and precipitation of additional amounts of desilication product on previously formed crystal surfaces, in preference to deposition on other surfaces such as those of heat exchange apparatus. The insolubilization of the silica in this manner, together with the turblence of the slurry maintains the heat exchanger surfaces quite clean, greatly improving heat exchange rates. This enables the bauxite slurry to be processed economically through any desired number of heat exchangers and through the main digestion system wherein the insolubilized sodium aluminum silicate is removed in the red mud residues. This has the further advantage of reducing the silica content of the entire plant liquor streams and of the final calcined alumina product.

In accordance with one embodiment of the invention, the method comprises the steps of forming a slurry of the aluminous ore in spent recycle alkali metal aluminate liquor, heating the slurry in a predigestion step to a temperature between about 150° F. and about 490° F. for a period of time sufficient to dissolve a portion of the alumina and to dissolve and to result in precipitation of substantially all the silica present in the form of insoluble complex sodium aluminum silicate, and then admixing said predigested slurry with the main body of recycle spent liquor (which may also contain make-up caustic alkali) and digesting the mixture at an elevated temperature to effect solution of the alumina in the ore in the spent liquor.

The proportion of spent recycle liquor used in the predigestion step to that of the main body of spent liquor used for digestion represents the least amount of liquor required to make the bauxite pumpable. Depending upon the type of bauxite or other ore being treated, this proportion may range from about 12% to about 35% by volume.

It should be noted that this predigestion is different from the regular digestion as practiced in the Bayer process, in that the bauxite to liquor ratio is considerably higher and that there is present insufficient liquor to dissolve all the soluble alumina from bauxite.

The predigestion temperature chosen will determine the residence time of the slurry in the predigester. Thus, a predigestion temperature in the range 180°–200° F. will require from 8 to 12 hours, whereas with a predigestion temperature of 390° F., the time may be shortened to as little as ½ hour.

Heat may be supplied to the predigestion step in the form of recovered steam from any desired flash cooling stage, depending upon the desired temperature. Heat may also be supplied wholly or partly by steam from an outside source.

The predigestion step is carried out in accordance with the invention, in either a single stage or in multiple stages. There is employed a covered tank equipped with stirrer, or a series of such tanks in which the effluent of a given predigester passes to the next tank in the series.

The bauxite, which has been first mixed with enough of the cold or partially heated minor portion of recycle liquor to make it pumpable and then ground, for example in a pug type mixer, forms a heavy slurry containing, for example, from about 25% to about 50% solids by weight. Heat is supplied to the predigester tanks by means of submerged heating coils, shell-tube heat exchangers, or direct steam injection, through which the recovered or other steam is passed. The slurry is introduced into the predigester, silica goes into solution, and after combining with the alumina and soda present, form sodium aluminum silicate which precipitates from the highly supersaturated solution as seeds soon after heating begins, equilibrium solubility being about 0.12 gram $SiO_2$ per liter. However, because of the supersaturation, as much as 0.50 g.p.l. may be carried in the liquor. The seeding overcomes the effect of the supersaturation and causes crystals to form. In multistage predigestion, the seeds scatter through the several stages and promote precipitation. The liquor may be recirculated to the first stage in order to equalize the stages and to adjust the average detention time over all the stages.

The predigestion step carried out with recovered steam in accordance with the invention results in greatly improved heat economy, purer silica-free alumina, and in a reduction in scale formation in the heat exchangers to about $\frac{1}{20}$ of that which takes place in the absence of this desilication practice.

The predigested slurry leaving the predigestion system will be composed of solids such as red mud, desilication product, and unreacted alumina, in suspension in sodium aluminate liquor. If the slurry is sufficiently hot it may be charged directly into the main digester. If not, the slurry is heated further in one or more heat exchangers to bring it to approximately the digester temperature, which is about 480° F. in accordance with conventional practice, the digester being under pressure. The slurry is brought to a temperature close to the digestion temperature by passage through a series of indirect heat exchangers each of which adds a certain amount of heat to the slurry. The selection of heat exchangers is determined by the temperature at which predigestion was performed. The temperature in the respective heat exchangers may vary from about 140° F. to digester temperature, and corresponding pressures may range from atmospheric to about 550 lbs. per sq. in. gauge.

Figure 2:
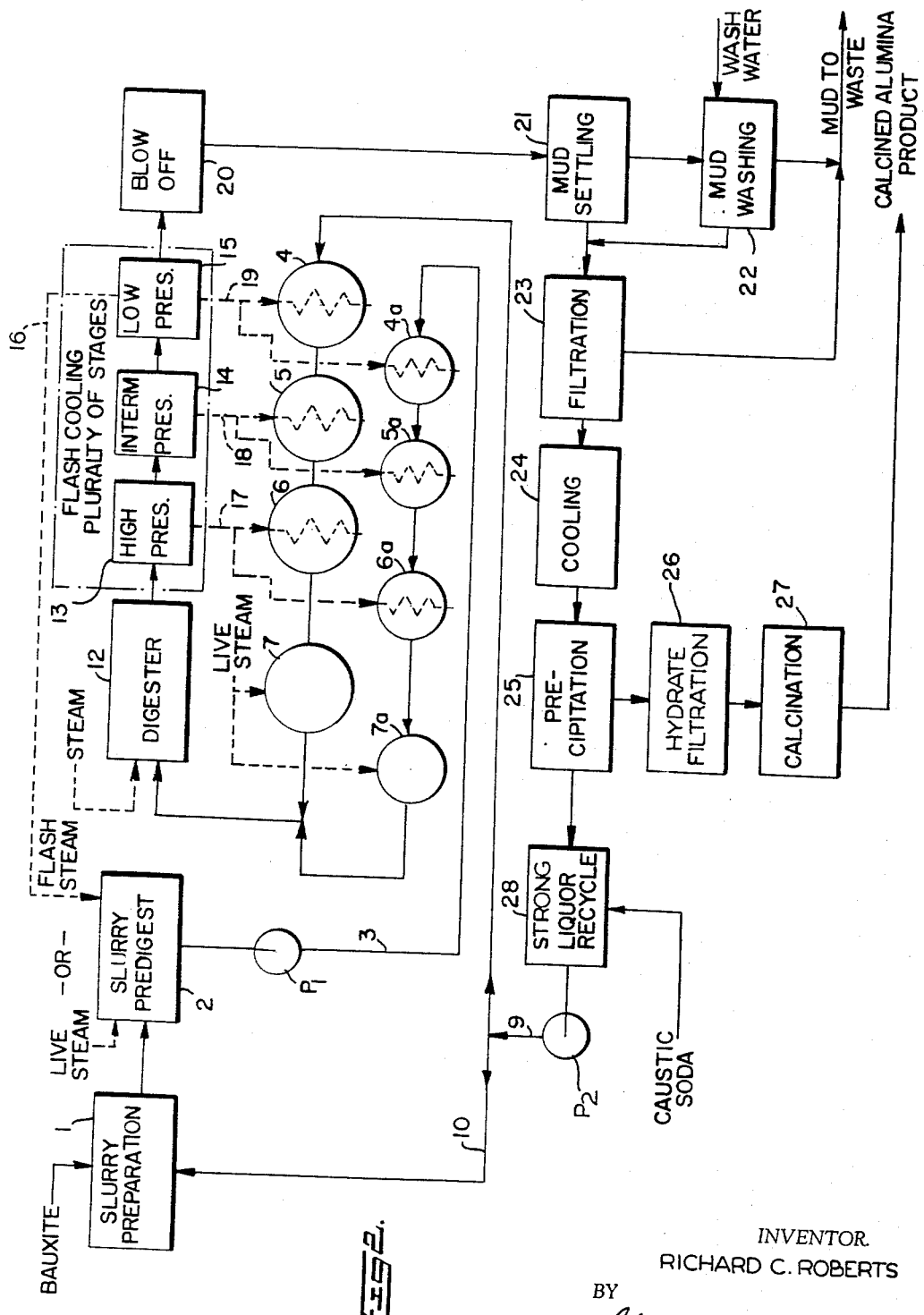

The operation of the novel method of the invention will be better understood by reference to the accompanying drawings, in which:

FIGURE 1 is a schematic flow diagram of one arrangement of apparatus for practicing the invention incorporating the predigestion step; and FIGURE 2 is a schematic flow diagram of a second arrangement of apparatus for practicing the invention.

In the arrangement shown in FIG. 1, bauxite or other aluminous ore is proportioned into slurry forming tank 1 where it is formed into a heavy slurry with a minor portion of recycle spent caustic liquor supplied through line 10, the amount of liquor being regulated so as to obtain a pumpable slurry. The recycle liquor may, if desired, be preheated to a moderate temperature, e.g. 180° F. in heat exchanger 4, prior to admixture with the bauxite. Following thorough mixing in the slurry tank, the mixture is charged to the slurry predigestion system 2, where its temperature is raised by means of flash steam supplied from flash cooling stage 15 via line 16, or by similar flash steam from flash cooling stages 13 and 14. If desired, new live steam may also be employed.

The slurry mixture is retained in the predigestion systme, which may comprise one or several stages, as previously described, at a temperature and for a time sufficient to insolubilize substantially all the silica as sodium aluminum silicate. The predigested slurry is then pumped via pump $P_1$ and line 3 to be introduced into the major portion of recycle spent liquor at point 8, located between heat exchangers 4 and 5. Optionally the apparatus may be arranged so that the predigested slurry joins the major portion of recycle spent liquor as it enters heat exchanger 4, or else at a point between heat exchangers 5 and 6, and 7, or even directly into digester 12.

The combined predigester slurry and major portion of the recycle spent liquor is heated by passage successively through heat exchangers 4, 5, 6 and 7, and then enters the digester 12 where it is held at elevated temperature for a period of time sufficient to complete solution of the alumina to form sodium aluminate liquor. The number of heat exchanger stages, e.g. 4, 5 and 6, will correspond to the number of flash stages chosen.

Upon discharge from the digester, the sodium aluminate liquor containing suspended red mud and desilication product is flash cooled in successive stages of decreasing pressure through vessels 13, 14, and 15, in accordance with conventional practice. The steam generated by flash cooling is supplied to corresponding heat exchangers 4, 5 and 6, or to preheating vessel 2, as previously explained. The number of flash cooling stages is not limited to three, however, but can be varied as dictated by considerations of optimum efficient recovery of heat between the selected main digester temperature and the atmospheric boiling point of the liquor.

The digested mixture from the last cooling stage 15 is reduced to substantially atmospheric pressure in blow-off tank 20 and is then passed to a settling tank 21, the overflow green liquor filtered in filter 23, and the underflow residues passed to washer 22 where fresh water is added to dissolve soluble alkali and alumina values. The washed red mud and insolubles from washer 22 are discarded, and the washings passed to filter 23 to be admixed with the green liquor and for removal of last traces of red mud. The clear pregnant or green liquor passes through cooler 24 to increase supersaturation of the alumina, and thence to precipitation apparatus 25 where approximately one-half of the alumina hydrate is precipitated. The precipitated alumina is filtered in filter apparatus 26, and calcined in heater 27 to produce a pure grade of calcined alumina suitable for reduction of aluminum.

The alkali aluminate liquor remaining in precipitator 25 is passed to vessel 28 where make-up caustic soda is added and then passed via pump $P_2$ and line 9 to become the stream of recycle spent liquor, to be divided into the aforementioned minor and major portions, the minor portion being sent to bauxite slurry preparation step 1, and the major portion going to the heat exchanger sequence to have its temperature raised with flash steam in successive stages, as described.

In an alternate arrangement shown in FIG. 2, the bauxite or other aluminous ore is proportioned to slurry preparation tank 1 for admixture with the minor portion of spent liquor, as before. After thorough mixing in the slurrying apparatus, the mixture is passed to the predigestion system 2, wherein its temperature is elevated by means of flash steam as described for FIG. 1. The mixture is retained in the predigestion system for a period of time sufficient to insolubilize the desilication product. The slurry is then pumped through line 3 by means of pump $P_1$, and thence through auxiliary heat exchangers 4a, 5a, 6a, and 7a, in order successively to increase its temperature with steam supplied from flash coolers 15, 14 and 13, respectively, as shown. As a variation, the slurry may be diverted between these heat exchange stages 4a, 5a, 6a, and/or 7a, and be combined with the main liquid stream between any of the heat exchangers 4, 5, 6 or 7, depending upon the amount of heat to be supplied. After the slurry has been combined with the main liquor stream it is passed to the digester 12, and is processed further as described in connection with FIG. 1.

In the practice of the invention, several advantages are achieved. First, there is a decrease in the overall heat demand for the alumina process which effect significant economies. Considerably less new injection steam is used at the digester or live steam heater owing to increased recovery of steam from the flash cooling of the digester discharge liquor. Second, the rate at which heat transfer surfaces of heat exchangers become scaled is greatly reduced, to about 1/20 of that prevailing otherwise. This results in less frequent cleanings, better heat transfer, more economical apparatus and operation. Further, the alkali aluminate liquors are found to contain ½ to ⅓ of the soluble silica which would be present under conventional processes, and the calcined alumina product has a lower silica content.

The following examples illustrates the practice of the invention, but is not to be regarded as limiting.

EXAMPLE

Using the apparatus of the type and arrangement shown in FIGURE 1, bauxite containing 2.6% $SiO_2$, slurried with spent liquor to a consistency of 1.5 to 2.3 parts by weight of liquor per part by weight of bauxite, is fed to predigestion equipment. Spent liquor used during the operation contains 0.5 to 0.6 gram of silica as $SiO_2$ per liter of liquor. Heat in the form of steam or vapor is introduced into heat exchange apparatus contained within the predigestion vessel to increase the slurry temperature to near atmospheric boiling of the slurry. Silica contained in the bauxite is taken into solution in the liquor and is subsequently precipitated in the form of a complex sodium aluminum silicate on the solid particles contained in the slurry when exposed to the slurry for several hours at atmospheric boiling. The initial silica solution concentration in the liquor immediately after introduction of the bauxite may exceed 2 or 3 g./l. When the slurry is retained (by staging or otherwise) for a sufficient time, the silica concentration in the liquor will decrease to about 0.25 g./l. Slurry withdrawn from the predigester is reintroduced in the major portion of the spent liquor stream to be fed to indirect vapor heat exchange apparatus.

The major and minor portions of the liquor stream after being combined are pumped through the heat exchange apparatus and are discharged at a temperature in the range of 380° to 430° F. The following data and the net heat inputs for the entire digestion operation, including that required for predigestion, are shown for the typical continuous operation, with and without the predigestion operation.

The data are given with and without the predigestion technique to illustrate the beneficial effects of such predigestion.

| | Process with Predigestion | Process without Predigestion |
|---|---|---|
| Portion of spent liquor subjected to regenerative indirect heat exchange, percent of total | 100 | 70–85 |
| Portion of bauxite subjected to regenerative indirect heat exchange, percent of total | 100 | 0 |
| Silica concentration in the plant liquor, $SiO_2$ g./l | 0.20 | 0.5–0.6 |
| Rate of scaling of heat exchanger surfaces, liquor and bauxite in the tubes, at 380° to 400° F. $(1/U^2 \times 10^{-5}$ vs. time) | 0.12 | 2.90–3.00 |
| Rate of scaling of heat exchange surfaces for conventional plant liquor at 390° F. $(1/U^2 \times 10^{-5}$ vs. time) | | 0.60–0.70 |
| Net heat input required in digestion, including predigestion (B.t.u. per pound of alumina produced) | 1,745 | 2,150–2,160 |

What is claimed is:

1. Method of reducing scale formation incident to the extraction of alumina from silica-containing aluminous ore with caustic alkali solution, which comprises the steps of:
   (a) maintaining a thick slurry of said ore in caustic alkali solution in a predigestion stage at a temperature between about 150° F. and about 490° F. for a period of time sufficient to accomplish precipitation of substantially all of the silica present in the liquor component of the slurry, the amount of caustic alkali present being insufficient to dissolve all the soluble alumina, but sufficient to dissolve substantially all the silica present in said ore; and thereafter (b) digesting said slurry with additional caustic alkali solution to effect extraction of the alumina present therein.

2. Method of preparing and treating a slurry of silica-containing aluminous ore incident to the extraction of alumina from said ore with caustic alkali solution, comprising the steps of:
(a) forming a thick slurry of the aluminous ore with a caustic alkali solution, the amount of caustic alkali present being insufficient to dissolve all the soluble alumina, but sufficient to dissolve substantially all the silica present in said ore;
(b) maintaining said slurry at a temperature between about 150° F. and about 490° F. for a period of time sufficient to precipitate dissolved silica as an insoluble desilication product in a form which remains suspended in the slurry; then
(c) heating said slurry substantially to digestion temperature at least partly by indirect heat exchange; and
(d) digesting the slurry with additional caustic alkali solution to effect extraction of alumina.

3. The method of claim 2 in which said ore slurry contains from about 25% to about 50% solids by weight.

4. The method of claim 2 in which said slurry is heated to a temperature in the range of 380° F. to 430° F. prior to digestion.

5. Method for the continuous extraction of alumina from aluminous ore in a cyclic system involving digestion of the ore at elevated temperature and pressure with a solution of a caustic alkali, comprising the steps of:
(a) recovering steam by cooling the digestion liquor;
(b) separating alumina from the digestion liquor to form a spent liquor;
(c) separating said spent liquor into a minor portion and a major portion;
(d) forming a thick slurry of fresh ore with caustic alkali solution comprising said minor portion of spent liquor, the amount of caustic alkali present being insufficient to dissolve all the soluble alumina, but sufficient to dissolve substantially all the silica present in said ore;
(e) predigesting said slurry at a temperature between about 150° F. and about 490° F. for a period of time sufficient to preicpitate dissolved silica as an insoluble desilication product;
(f) heating said major portion of the liquor substantially to digestion temperature by heat exchange with said recovered steam;
(g) admixing said predigested slurry with said major portion of spent liquor; and
(h) digesting the mixture to effect extraction of the remainder of the alumina present in the ore.

6. The method of claim 5 in which the ore is bauxite.

7. The method of claim 5 in which said minor portion is about 12% to about 35% by volume of the spent liquor.

8. The method of claim 5 in which the predigestion time is from about ½ to 12 hours.

9. The method of claim 5 in which the cooling of the digestion liquor is carried out in a plurality of stages and the predigested slurry is heated by heat exchange with recovered steam from at least one of the cooling stages.

10. The method of claim 5 in which the cooling of the digestion liquor is carried out in a plurality of stages and the predigested slurry is heated by heat exchange with recovered steam from all but the last stage.

11. The method of claim 5 in which the cooling of the digestion liquor is carried out in a plurality of stages and the predigested slurry is heated in admixture with the major portion of the spent liquor by heat exchange with recovered steam from successive cooling stages.

12. The method of claim 5 in which the cooling of the digestion liquor is carried out in a plurality of stages and the predigested slurry is heated separately by heat exchange with recovered steam from said cooling stages and the major portion of spent liquor is separately heated by heat exchange with recovered steam from said cooling stages, and the slurry and spent liquor are then admixed.

13. The method of claim 12 in which the respective successive heating stages of the slurry and the spent liquor are carried out with recovered steam from corresponding stages.

14. The method of claim 5 in which the precipitation step involves maintaining said slurry at a temperature close to its atmospheric boiling point.

15. The method of claim 5 in which said thick ore slurry has from 1.5 to 2.3 parts by weight of liquor for each part by weight of ore, said ore being bauxite.

16. The method of claim 5 in which the predigested slurry is heated substantially to digestion temperature in admixture with said major portion of the spent liquor at least partly by indirect heat exchange.

References Cited

UNITED STATES PATENTS

| | | | |
|---|---|---|---|
| 2,056,993 | 10/1936 | Weigel | 23—143 |
| 2,375,343 | 5/1945 | Brown | 23—141 |
| 2,701,752 | 2/1955 | Porter | 23—143 |
| 2,946,658 | 7/1960 | Donaldson | 23—143 |

OSCAR R. VERTIZ, *Primary Examiner.*

H. T. CARTER, *Assistant Examiner.*